US006749241B1

United States Patent
Erlandsson et al.

(10) Patent No.: US 6,749,241 B1
(45) Date of Patent: Jun. 15, 2004

(54) VEHICLE CARGO PANEL HAVING RETRACTABLE BELT

(75) Inventors: Per Erlandsson, Skara (SE); Öivind Nilsrud, Skara (SE); Anna Brolén, Skövde (SE); Jayshree Kerai, Norrahammar (SE)

(73) Assignee: Collins & Aikman Products, Troy, MI (US)

( * ) Notice: Subject to any disclaimer, the term of this patent is extended or adjusted under 35 U.S.C. 154(b) by 34 days.

(21) Appl. No.: 10/356,990

(22) Filed: Feb. 3, 2003

Related U.S. Application Data
(60) Provisional application No. 60/406,763, filed on Aug. 29, 2002.

(51) Int. Cl.⁷ .................................................. B60P 7/14
(52) U.S. Cl. ..................... 296/24.4; 410/100; 410/118; 410/129
(58) Field of Search ................................ 410/100, 117, 410/118, 129, 142; 296/24.1, 37.1, 37.16, 24.4

(56) References Cited

U.S. PATENT DOCUMENTS

| | | | |
|---|---|---|---|
| 3,169,781 A | 2/1965 | Abruzzino | 280/150 |
| 3,190,686 A | 6/1965 | Smiler | 296/24.1 |
| 3,367,707 A | 2/1968 | Merriweather | 296/24.1 |
| 3,685,799 A | * 8/1972 | Wriedt | |
| 3,767,253 A | 10/1973 | Kluetsch | 296/24.1 |
| 3,891,263 A | 6/1975 | Orsulak | 296/24.1 |
| 3,910,625 A | 10/1975 | Menard | |
| RE28,788 E | 4/1976 | Williamson, III | 280/179 |
| 4,096,807 A | 6/1978 | Woodward | 105/467 |
| 4,139,231 A | 2/1979 | Lang et al. | 296/37.16 |
| 5,026,231 A | 6/1991 | Moore | 410/118 |
| 5,090,856 A | 2/1992 | Moore | 410/118 |
| D325,016 S | 3/1992 | Moore | D12/155 |
| 5,207,260 A | 5/1993 | Commesso | 160/135 |
| 5,551,726 A | 9/1996 | Ament | 280/749 |
| 5,632,520 A | 5/1997 | Butz | 296/24.1 |
| 5,711,568 A | 1/1998 | Diem et al. | 296/37.16 |

(List continued on next page.)

FOREIGN PATENT DOCUMENTS

| | | |
|---|---|---|
| DE | 2759777 | 6/1986 |
| DE | 43 00904 | 7/1993 |
| DE | 4426882 | * 10/1995 |
| DE | 19520584 | 12/1996 |
| DE | 19650768 | 6/1998 |

(List continued on next page.)

*Primary Examiner*—Dennis H. Pedder
(74) *Attorney, Agent, or Firm*—Myers Bigel Sibley & Sajovec

(57) ABSTRACT

Apparatus are provided for storing items within vehicle cargo compartments. A panel is pivotally secured within a cargo compartment and is movable between a closed position in adjacent, face-to-face relationship with the wall and one or more open positions substantially transverse to the wall, and a retractable retaining belt operably associated with the panel. The retaining belt is movable between retracted and extended positions. The retaining belt has a free end and a post attached to the free end that is configured to be gripped by a user so as to move the retaining belt to an extended position. A floor within the vehicle includes one or more apertures formed therein, and the post includes an end portion that is configured to be removably inserted into the one or more apertures so as to maintain the retaining belt in one or more respective extended positions.

15 Claims, 3 Drawing Sheets

U.S. PATENT DOCUMENTS

| | | | |
|---|---|---|---|
| 5,772,370 A | 6/1998 | Moore | 410/100 |
| 5,947,358 A | 9/1999 | Wieczorek | 224/543 |
| 5,954,380 A | 9/1999 | Ament et al. | 296/24.1 |
| 5,971,433 A | 10/1999 | Ament et al. | 280/749 |
| 6,004,084 A * | 12/1999 | Moker | 410/118 |
| 6,007,283 A | 12/1999 | Labeur | 410/97 |
| 6,099,222 A | 8/2000 | Moore | 410/100 |
| 6,125,908 A | 10/2000 | Ament et al. | 160/323.1 |
| 6,183,177 B1 | 2/2001 | Dahlgren | 410/100 |
| 6,325,436 B1 | 12/2001 | Ehrenberger et al. | 296/24.1 |
| 6,349,986 B1 | 2/2002 | Seel et al. | 296/37.16 |
| 6,402,217 B1 | 6/2002 | Ament et al. | 296/37.16 |
| 6,439,633 B2 | 8/2002 | Nemoto | 296/37.14 |
| 6,616,389 B1 * | 9/2003 | Ament et al. | 410/118 |

FOREIGN PATENT DOCUMENTS

| | | |
|---|---|---|
| DE | 19811886 | 9/1999 |
| EP | 0 203 824 | 12/1986 |
| EP | 0 659 611 | 6/1995 |
| FR | 2 470 033 | 6/1977 |
| GB | 2273481 | 6/1994 |
| GB | 2334488 | 8/1999 |
| JP | 61193949 | 8/1986 |
| JP | 4002534 | 1/1992 |
| WO | WO 01/40023 | 6/2001 |

* cited by examiner

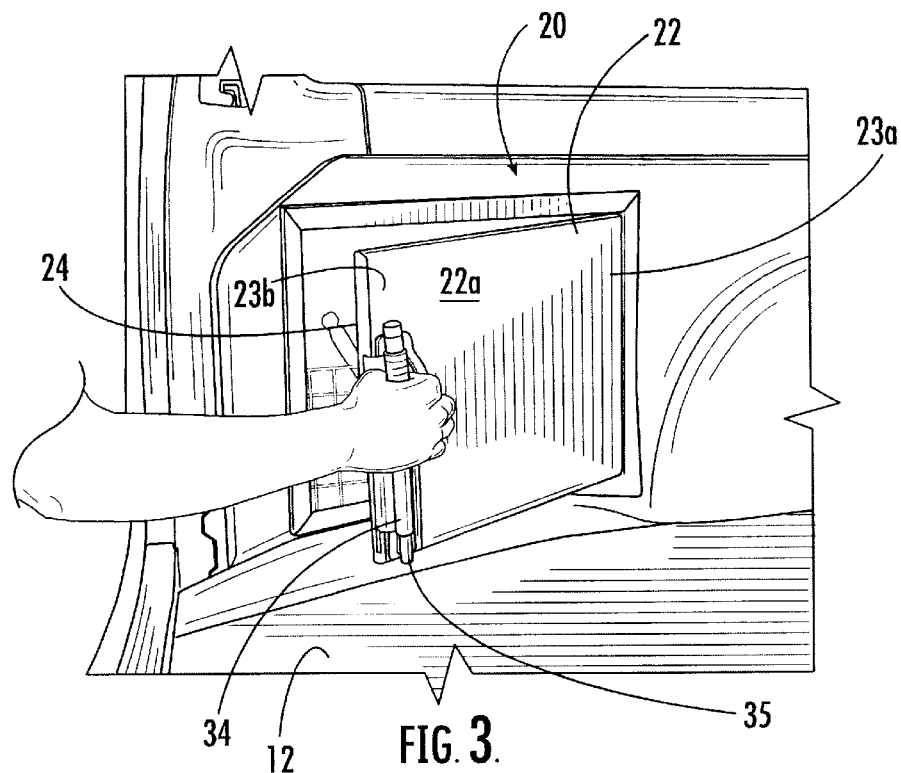
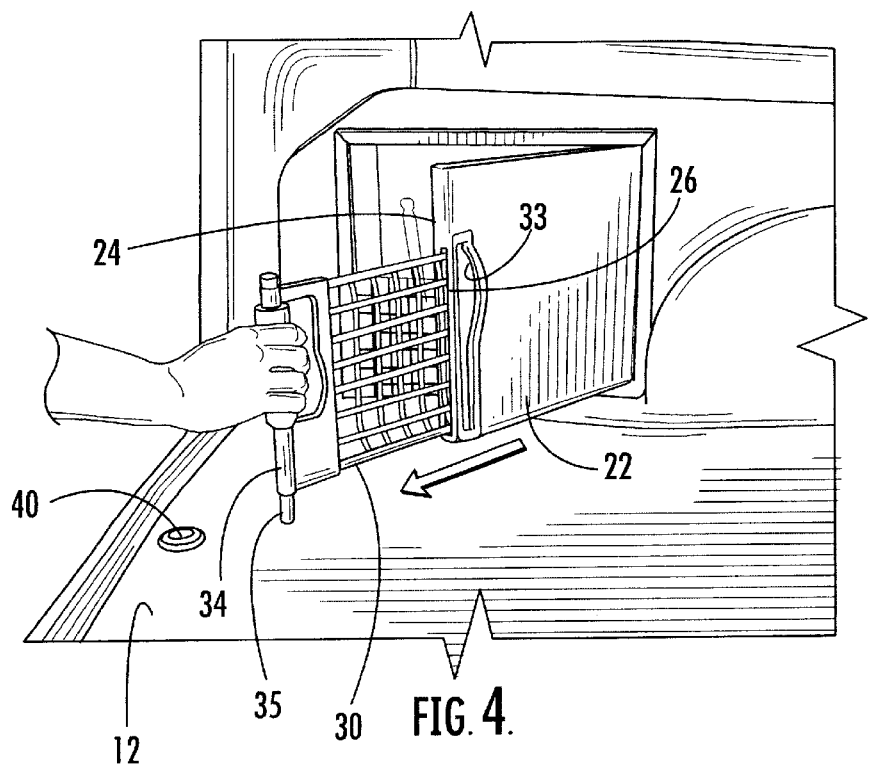

VEHICLE CARGO PANEL HAVING RETRACTABLE BELT

RELATED APPLICATION

This application claims the benefit of U.S. Provisional Application No. 60/406,763, filed Aug. 29, 2002, the disclosure of which is incorporated herein by reference in its entirety as if set forth fully herein.

FIELD OF THE INVENTION

The present invention relates generally to vehicles and, more particularly, to cargo management apparatus for use within vehicles.

BACKGROUND OF THE INVENTION

Motor vehicles are typically provided with a cargo storage compartment of some type. For example, sedan-style automobiles are conventionally equipped with a trunk. Sport/utility vehicles, mini-vans, and other vehicles in which there are two or more rows of seating, are conventionally provided with a cargo storage area behind the last row of seating.

Items carried within vehicle cargo storage areas are often free to move about during vehicle operation, which may be undesirable. Cargo netting may be used to restrain items from movement within vehicle cargo storage compartments. While such netting may adequately restrain items from movement, cargo netting may require the use of two hands to hold the cargo netting back while placing items therewithin, which may be cumbersome.

Various devices are known for dividing vehicle storage compartments to prevent movement of items stored therein. For example, U.S. Pat. No. 6,027,155 to Wisniewski et al. describes a storage system for a vehicle cargo compartment that includes a cover that is removably attached to the floor of the cargo compartment and that is configured to rotate between open and closed positions. U.S. Pat. No. 5,669,537 to Saleem et al. describes a storage unit that extends between, and connects to, vehicle panels of a vehicle storage area. U.S. Pat. No. 5,501,384 to Wisniewski describes a storage system for a vehicle that includes a molded bin and a cover pivotally secured to the bin.

Unfortunately, these devices are somewhat complex and bulky and are not adapted to be compactly stored within the cargo storage area of a vehicle. Moreover, in vehicles such as sport/utility vehicles and mini-vans, cargo storage space may be somewhat limited. Accordingly, a need exists for a cargo storage device that can securely retain items within a cargo storage area during operation of a vehicle and that can be easily stored in an out-of-the-way location when not needed, and without requiring that the storage device be removed from the cargo storage area. In addition, a need exists to maximize the efficiency and utilization of existing cargo storage space without intruding on passenger space.

SUMMARY OF THE INVENTION

In view of the above discussion, an apparatus for storing items within vehicles is provided that includes a panel pivotally secured within a cargo compartment (e.g., to a vehicle cargo compartment wall, floor, etc.) and movable about a substantially vertical axis between a closed position in adjacent, face-to-face relationship with the wall and one or more open positions substantially transverse to the wall, and a retractable retaining belt operably associated with the panel, wherein the retaining belt is movable between retracted and extended positions. The retaining belt has a free end and a post attached to the free end that is configured to be gripped by a user so as to move the retaining belt to an extended position. A floor within the vehicle (e.g., a vehicle cargo compartment floor) includes one or more apertures formed therein, and the post includes an end portion that is configured to be removably inserted into the one or more apertures so as to maintain the retaining belt in one or more respective extended positions.

According to embodiments of the present invention, the retaining belt is disposed within the panel, and the retaining belt free end extends from a slot within the panel. The slot may be formed in various locations on the panel. A preferred location for the slot is in a free end of the panel or adjacent thereto.

The retaining belt may be formed from various materials and may have various shapes, lengths and configurations. According to embodiments of the present invention, the belt has a web configuration.

According to embodiments of the present invention, the panel may include a pocket formed therein that is configured to removably receive the post therein when the retaining belt is in a retracted position. The post serves as a handle that can be gripped by a user to move the panel from a closed position to an open position when the post is retained in the pocket.

According to embodiments of the present invention, the panel may be configured to be substantially flush with the wall when in the closed position. According to embodiments of the present invention, the vehicle wall may have a storage area formed therewithin. The panel may be pivotally secured to the wall and movable between a closed position covering the storage area and one or more open positions substantially transverse to the wall allowing access to the storage area.

BRIEF DESCRIPTION OF THE DRAWINGS

FIG. 3 illustrates the storage apparatus of FIG. 1 with the panel being moved by a user to an open position.

FIG. 4 illustrates the storage apparatus of FIG. 1 with the retractable retaining belt being moved to an extended position.

DETAILED DESCRIPTION OF THE INVENTION

Figure 1:
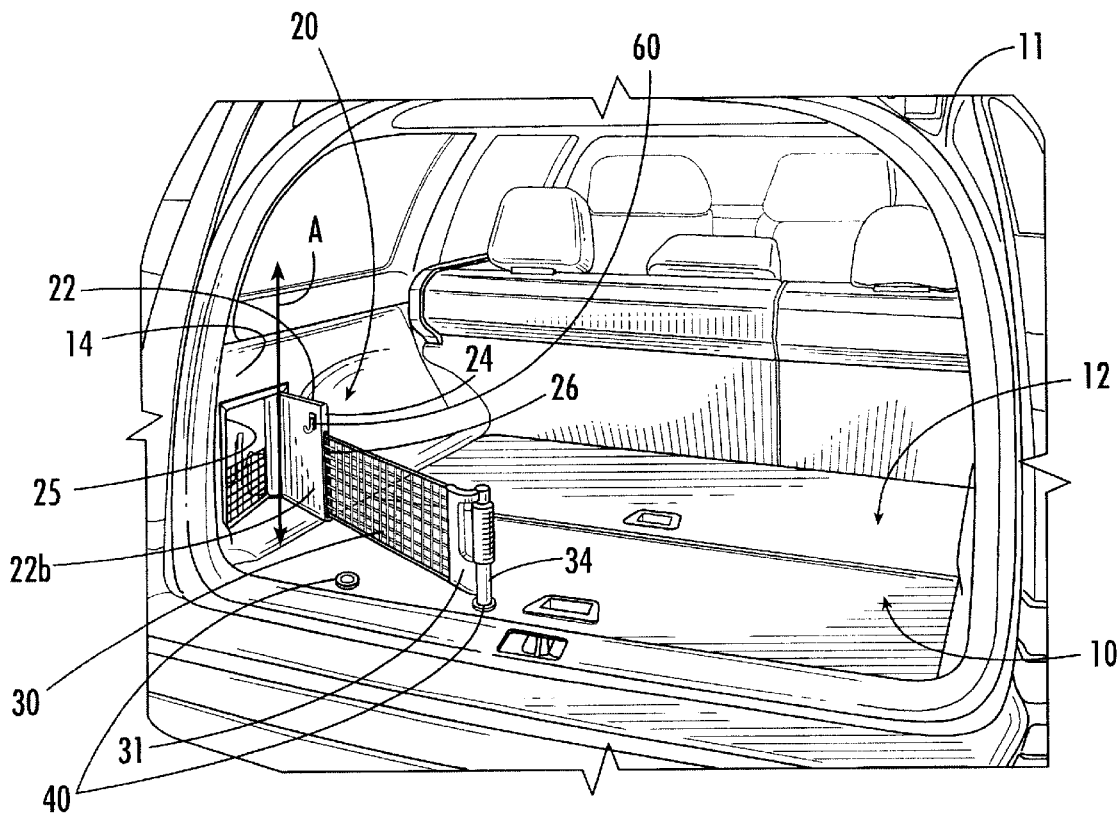
FIG. 1 is a perspective view of a portion of a cargo compartment of a vehicle having a storage apparatus according to embodiments of the present invention, and wherein the panel of the storage apparatus is in an open position and the retractable retaining belt has been extended from the panel.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In the drawings, the thickness of lines, layers and regions may be exaggerated for clarity. It will be understood that when an element is referred to as being "on" another element, it can be directly on the other element or intervening elements may also be present. In contrast, when an element is referred to as being "directly on" another element, there are no intervening elements present. It will be understood that when an element is referred to as being "connected" or "attached" to another element, it can be directly connected or attached to the other element or intervening elements may also be present. In contrast, when an element is referred to as being "directly connected" or "directly attached" to another element, there are no intervening elements present. The terms "upwardly", "downwardly", "vertical", "horizontal" and the like are used herein for the purpose of explanation only.

Referring to FIG. 1, an exemplary cargo compartment 10 of a vehicle 11 is illustrated. Embodiments of the present invention may be utilized in various cargo compartments of various types of vehicles, such as automobile trunks, the rear storage areas of mini-vans, trucks, and/or sport utility vehicles, etc. The illustrated vehicle cargo compartment 10 includes a load floor (hereinafter "floor") 12 and a wall 14 extending upwardly from the floor around the periphery of the floor 12.

A storage apparatus 20 according to embodiments of the present invention is incorporated into the wall 14 as illustrated. The storage apparatus 20 includes a panel 22 that is pivotally secured to the cargo compartment wall 14 and that is movable about a substantially vertical axis A between a closed position (FIG. 2) covering a storage area 25 within the wall 14 and one or more open positions (FIG. 1) wherein the panel 22 is substantially transverse to the wall 14 allowing access to the storage area 25. According to embodiments of the present invention, the panel 22 may be pivotally secured to the floor 12 or to other cargo compartment surfaces.

The illustrated panel 22 has a generally rectangular shape and includes front and rear surfaces 22a, 22b, and opposite first and second end portions 23a, 23b. In the illustrated embodiment, the panel 22 is pivotally secured to the wall 14 along the panel first end portion 23a, and the second end portion 23b is a free end.

A hinge of virtually any type may be utilized to pivotally attach the panel 22 to the wall 14 (or other vehicle component/panel/floor). According to embodiments of the present invention, an upholstery material or floor covering (e.g., carpeting) disposed on the wall 14 and on the panel front surface 22a may serve as a hinge. In addition, the panel 22 may be pivotally attached to the wall 14 or other vehicle component/panels/floor at various angles relative to vertical. A pivot axis (e.g., axis A) need not be vertical.

The panel 22 may be configured to be substantially flush with the wall 14 when the panel 22 is in the closed position. Accordingly, the storage apparatus 20 may appear integral with a vehicle compartment 10 when the panel 22 is in the closed position. However, it is to be understood that embodiments of the present invention do not require the panel 22 to be flush with a vehicle cargo compartment wall 14. Moreover, embodiments of the present invention do not require a storage area within a wall. A panel, according to embodiments of the present invention, may be a panel that is pivotally attached to a wall or other component within a vehicle cargo compartment and that does not cover a storage compartment when in a closed position.

A retractable retaining belt 30 is operably associated with the panel 22 and is movable between a retracted position (FIG. 2) and one or more extended positions (FIG. 1). In the illustrated embodiment, the retaining belt 30 is disposed within the panel 22 and is extended and retracted from and into the panel 22 via a slot 26 formed within the panel free end 24.

The illustrated retaining belt 30 has a web configuration. The retaining belt 30 may be formed from various types of materials including, but not limited to, natural and man-made polymers. The illustrated retaining belt 30 has a free end 31 and an opposite end (not shown) that is attached to a rotatable shaft (also not shown) mounted within the panel 22. According to embodiments of the present invention, the rotatable shaft rotates about the vertical axis A. The retaining belt 30 is configured to be reeled from the rotatable shaft in response to a user pulling on the free end 31 of the belt 30.

According to embodiments of the present invention, a constant tension mechanism (not shown) is associated with the retaining belt 30 and the panel 22 and is configured to maintain a substantially constant tension on the retaining belt 30 relative to the panel 22 at all positions of the retaining belt 22 between extended and retracted positions. Thus, unless the retaining belt 30 is retained in an extended position, the tension mechanism is configured to cause the retaining belt 30 to be reeled back onto the rotatable shaft and, thus, retract into the panel 22. Rotatable shafts and tension mechanisms that may be utilized in accordance with embodiments of the present invention are well known to those skilled in the art and need not be described further herein. An exemplary rotatable shaft and tension mechanism is utilized in conventional retractable window shades, which are well known to those of skill in the art.

Figure 2:
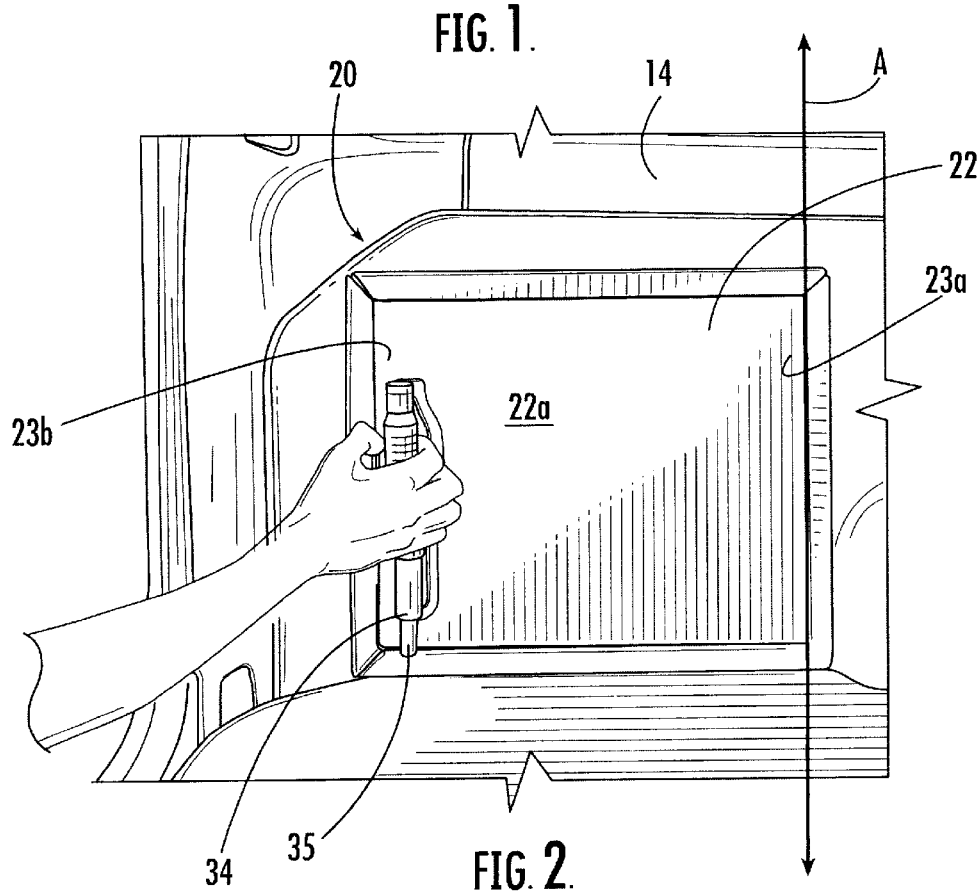
FIG. 2 illustrates the storage apparatus of FIG. 1 with the panel in a closed position.

In the illustrated embodiment, a post 34 is attached to the retaining belt free end 31 and is configured to be gripped by a user so as to move the retaining belt 30 to an extended position. A pocket 33 is formed on the front surface 22a of the illustrated panel 22 that is configured to removably secure the post 35 when the retaining belt 30 is in a retracted position (FIG. 2). When retained within the pocket 33, the post 35 serves as a handle configured to be gripped by a user for moving the panel 22 from a closed position (FIG. 2) to an open position (FIG. 3).

However, embodiments of the present invention are not limited to having a pocket 33 in the front surface 22a of panel 22. The retaining belt 30 may extend and retract from slot 26 without such a pocket to receive the post 35 thereof. The panel 22 may include a handle attached thereto that is utilized to open and close the panel 22. In addition, slot 26 need not be formed in the panel free end 24. A slot may be formed in various portions of panel 22, without limitation.

In the illustrated embodiment, the vehicle cargo compartment floor 12 includes a pair of apertures 40 formed therein. The post 34 has an end portion 35 that is configured to be removably inserted into each of the apertures 40 and to maintain the retaining belt 30 in respective extended positions. In FIG. 1, the post end portion 35 is inserted in the right-most aperture 40. However, embodiments of the present invention are not limited to the illustrated arrangement for maintaining the retaining belt 30 in extended positions. In lieu of apertures, other mechanisms such as slots, tabs, hook and loop fastening systems, etc. may be utilized to maintain the retaining belt 30 in extended positions.

Figure 5:
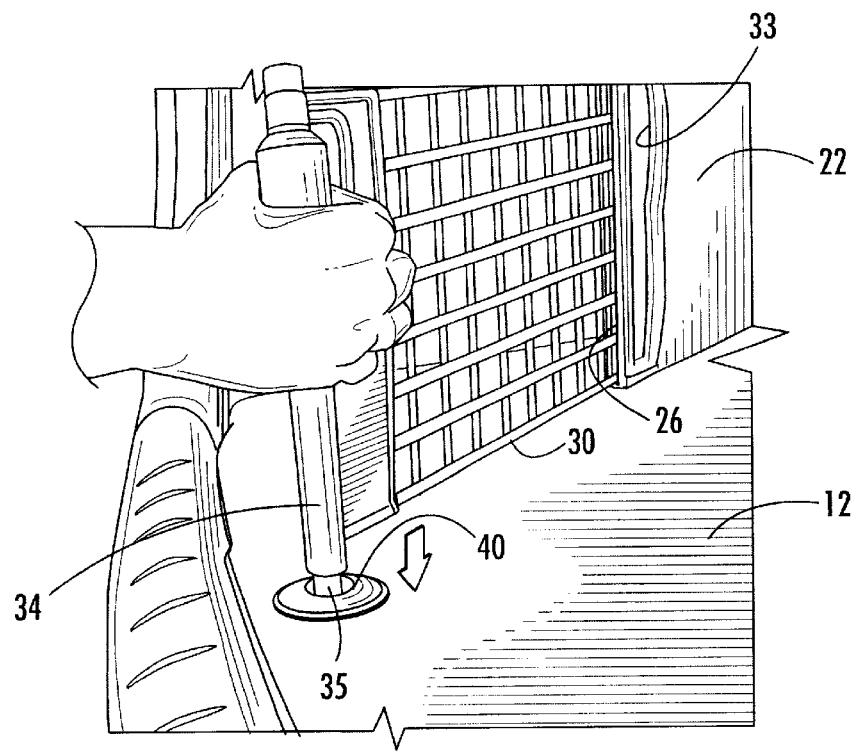
FIG. 5 illustrates an end post of the retractable retaining belt being inserted into an aperture in the floor of the vehicle cargo compartment of FIG. 1 to maintain the retractable retaining belt in an extended position, according to embodiments of the present invention.
Figure 6:
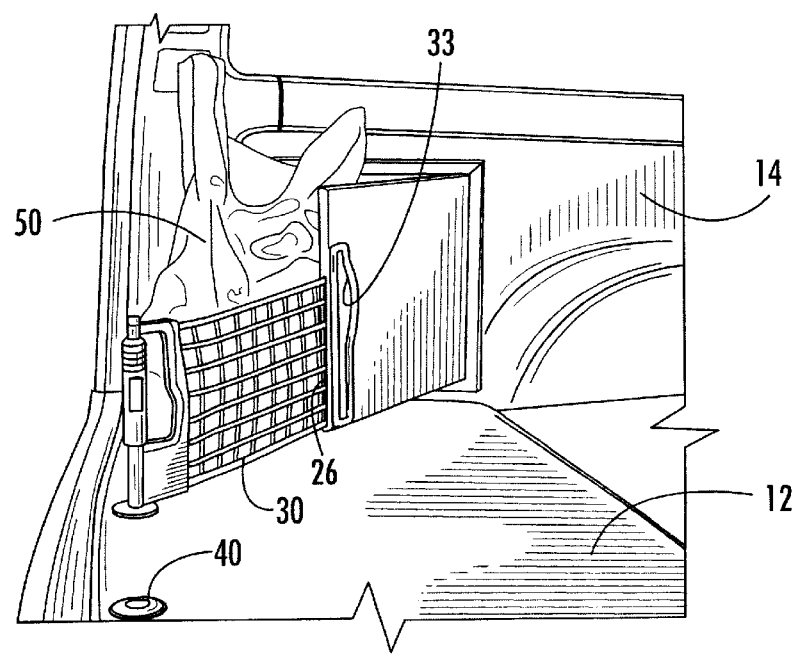
FIG. 6 is a perspective view of the storage apparatus of FIG. 1, wherein the retractable retaining belt is secured in an extended position and is retaining articles placed between the retaining belt and the cargo compartment wall.

FIGS. 2–6 illustrate a sequence of operations for the storage apparatus 20, according to embodiments of the present invention. In FIG. 2, the panel is closed and a user is grasping the post 34 which is disposed within the pocket 33 on the panel front surface 22a. The user pulls the panel 22 open (FIG. 3) and begins to extend the retaining belt outwardly from the panel 22 (FIG. 4). The user inserts the end portion 35 of the post 34 in an aperture 40 to maintain the retaining web in an extended position against the force imparted on the retaining belt by the tension mechanism (FIG. 5). In FIG. 6, a bag 50 containing articles has been placed between the extended retaining belt 30 and the wall 14.

Referring to FIG. 1, the storage apparatus 20, according to other embodiments of the present invention, includes one or more projections 60 extending from the panel 22, wherein each projection 60 is configured to support articles (e.g., grocery bags) suspended therefrom. The projections 60 may have various shapes and sizes. Embodiments of the present invention are not limited to the illustrated projections 60. Moreover, various numbers of projections may be utilized and may be located on either surface 22a, 22b of panel 22.

The panel 22 and retaining belt 30 of the storage apparatus 20 illustrated in FIGS. 1–6 are configured to facilitate retention of articles stored within a vehicle cargo compartment. Articles may be placed against the panel 22 and retaining belt 30 to limit movement of the articles when a vehicle is in motion. Various additional devices including, but not limited to, straps, cargo nets, and the like may be utilized in conjunction with the storage apparatus 20. Moreover, the present invention is not limited to the illustrated storage apparatus 20. Storage apparatus according to embodiments of the present invention may have various shapes, sizes and configurations.

Embodiments of the present invention provide aesthetically clean and boxy appearances within vehicle trunks or other cargo compartments without sacrificing storage space. Various other types of cargo management systems may be integrated into embodiments of the present invention. More than one storage apparatus according to embodiments of the present invention may be utilized within a single vehicle cargo compartment. For example, two storage apparatus 20 may be utilized on opposite sides of an automobile trunk. In addition, the retaining belt may be configured to extend to various locations within a vehicle cargo compartment. More than one retaining belt may also be utilized and may be extendable from the panel 22.

That which is claimed is:

1. An apparatus for storing items within a vehicle compartment, wherein the vehicle compartment includes a floor and a wall extending upwardly from the floor, the apparatus comprising:
a panel pivotally secured within the compartment and movable about a substantially vertical axis between a closed position in adjacent, face-to-face relationship with the wall and at least one open position substantially transverse to the wall; and
a retractable retaining belt operably associated with the panel, wherein the retaining belt is movable between retracted and extended positions; wherein the retaining belt comprises a free end and a post attached to the free end, and wherein the post is configured to be gripped by a user so as to move the retaining belt to an extended position;
wherein the panel comprises a pocket formed therein that is configured to removably receive the post therein when the retaining belt is in a retracted position, and wherein the post serves as a handle configured to be gripped by a user to move the panel from a closed position to an open position when the post is retained in the pocket.

2. The apparatus of claim 1, wherein the floor comprises at least one apertures formed therein, and wherein the post comprises an end portion that is configured to be removably inserted into the at least one aperture so as to maintain the retaining belt in at least one extended position.

3. The apparatus of claim 1, wherein the retaining belt is disposed within the panel, and wherein the retaining belt free end extends from a slot in the panel.

4. The apparatus of claim 3, wherein the panel comprises a free end and wherein the slot is formed in the panel free end.

5. The apparatus of claim 1, wherein the panel is substantially flush with the wall when in the closed position.

6. The apparatus of claim 1, wherein the wall has a storage area formed therewithin, and wherein the panel is pivotally secured within the compartment and movable about a substantially vertical axis between a closed position covering the storage area and at least one open position substantially transverse to the wall allowing access to the storage area.

7. The apparatus of claim 1, wherein the retaining belt comprises a web of material.

8. The apparatus of claim 1, wherein the retaining belt comprises elastic material.

9. A vehicle, comprising:
a cargo compartment comprising a floor, a wall extending upwardly from the floor, and a storage area formed within the wall;
an apparatus for storing items within the cargo compartment comprising:
a panel pivotally secured within the compartment and movable about a substantially vertical axis between a closed position in adjacent, face-to-face relationship with the wall and at least one open position substantially transverse to the wall;
a retractable retaining belt operably associated with the panel, wherein the retaining belt is movable between retracted and extended positions, wherein the retaining belt comprises a free end and a post attached to the free end, and wherein the post is configured to be gripped by a user so as to move the retaining belt to an extended position; and
wherein the panel comprises a pocket formed therein that is configured to removably receive the post therein when the retaining belt is in a retracted position, and wherein the post serves as a handle configured to be gripped by a user to move the panel from a closed position to an open position when the post is retained in the pocket.

10. The vehicle of claim 9, wherein the floor comprises at least one aperture formed therein, and wherein the post comprises an end portion that is configured to be removably inserted into the at least one aperture so as to maintain the retaining belt in at least one extended position.

11. The vehicle of claim 9, wherein the retaining belt is disposed within the panel, and wherein the retaining belt free end extends from a slot in the panel.

12. The vehicle of claim 11, wherein the panel comprises a free end and wherein the slot is formed in the panel free end.

13. The vehicle of claim 9, wherein the panel is substantially flush with the wall when in the closed position.

14. The vehicle of claim 9, wherein the retaining belt comprises a web of material.

15. The vehicle of claim 9, wherein the retaining belt comprises elastic material.

* * * * *